United States Patent [19]

Strazdins

[11] 4,002,588
[45] Jan. 11, 1977

[54] HYDROPHILIC-HYDROPHOBIC AMPHOTERIC POLYSALT SIZING COMPOSITONS AND PAPER SIZED THEREWITH

[75] Inventor: Edward Strazdins, Fairfield, Conn.

[73] Assignee: American Cyanamid Company, Stamford, Conn.

[22] Filed: May 8, 1974

[21] Appl. No.: 468,113

[52] U.S. Cl. .............. 260/29.6 NR; 162/164 EP; 162/168 N; 162/168 NA; 260/29.6 H; 260/29.6 HN; 260/836; 260/857 UN; 260/874; 260/895

[51] Int. Cl.$^2$ .............. C08L 39/04; C08L 63/00; C08L 77/00

[58] Field of Search ..... 260/874, 857, 895, 29.6 H, 260/29.6 HN, 29.6 NR, 836, 857 UN

[56] References Cited

UNITED STATES PATENTS

| | | | |
|---|---|---|---|
| 2,890,978 | 6/1959 | Woodberry et al. | 260/89.7 S |
| 2,922,768 | 1/1960 | Mino et al. | 260/17.4 |
| 3,660,338 | 5/1972 | Economon | 260/874 |
| 3,677,888 | 7/1972 | Economon | 260/874 |

*Primary Examiner* — J. Ziegler
*Attorney, Agent, or Firm* — Charles F. Costello, Jr.

[57] ABSTRACT

The polysalt which consists essentially of a specified acrylamide-styrene-acrylic acid interpolymer and a water-soluble cationic polyamine having a molecular weight in excess of 1,000 (the molar ratio of the anionic to the cationic substituents in the anionic polymer and in the polyamine being within specified ranges) is an efficient strengthening agent for paper. Compositions of the polysalts and an ionization suppressor for the anionic components therein can be employed as beater additives in paper manufacture at a mildly acid pH leading to a nearly neutral paper having excellent dry strength and, if desired, wet strength.

9 Claims, No Drawings

HYDROPHILIC-HYDROPHOBIC AMPHOTERIC POLYSALT SIZING COMPOSITONS AND PAPER SIZED THEREWITH

BACKGROUND OF THE INVENTION

It is known that certain polysalt compositions which are composed of oppositely charged wet or dry strengthening agents for paper and an ionization suppressor provide paper of improved strength when added to beater pulp. A variety of these compositions and methods for the manufacture of strengthened paper therewith is disclosed in Economou U.S. Pat. Nos. 3,660,338 and 3,677,888.

FIELD OF THE INVENTION

The present invention relates to a novel water-soluble amphoteric polysalt useful as strengthening agent in the manufacture of paper. The invention includes the polysalt itself, paper having a content thereof, compositions of the polysalt with an ionization suppressor, and processes for the manufacture of paper of improved strength resulting from a content of the polysalt.

DESCRIPTION OF THE PRIOR ART

U.S. Pat. No. 3,660,338 discloses that a normally liquid water-insoluble polysalt coacervate, wherein one of the component polymers is only weakly ionic, is water-soluble when it contains a sufficient amount of an ionization suppressor. The compositions of the patent are strengthening agents useful as beater additives in the manufacture of paper.

U.S. Pat. No. 3,677,888 discloses that when an aqueous solution of the polysalt-ionization suppressor composition of the patent is added to a papermaking fibrous suspension, the polysalt is precipitated out of solution as colloidal droplets. The patent further discloses that the droplets are substantively adsorbed by the fibers while the fibers are in aqueous suspension and bind the fibers together when the fibrous suspension is further processed into paper. The result is paper of improved strength.

SUMMARY OF THE INVENTION

The discovery has now been made that the polysalt composed of an acrylamide-acrylic acid copolymer containing a small proportion of styrene units and a water-soluble cationic polymer having a molecular weight in excess of about 1,000 (as more particularly hereinafter described) is an effective strengthening agent for paper. I have also found that this polysalt, when colloidally dispersed in moderately acid and even substantially neutral aqueous medium, is substantive to cellulose papermaking fibers suspended in the medium and that these colloidal droplets or particles are strongly adsorbed by the cellulose fibers even though the aqueous medium has a high dissolved or dispersed content of black liquor solids and a high content of dissolved sulfate ions. I have further found that a mixture of a major proportion of the anionic component and a minor proportion of the cationic component in water is solubilized by an added acidic ionization suppressor and that the resulting solution releases its polysalt content in colloidal (ionic) state when the pH of the solution is raised to a value between about 4 and 7.

I have finally found that the invention permits the manufacture of paper possessing good dry strength (and if desired, both wet and dry strength) without need for alum at a nearly neutral pH from a pulp which has a substantial content of black liquor solids.

More in detail, according to the present invention the anionic component of the polysalt is a vinyl polymer which consists essentially of acrylamide, styrene and acrylic acid units (or their equivalents) in such proportion within the molar range of 94 – 65 : 5 – 15 : 1 – 20 (totalling 100%), that the polymer does not dissolve in water but disperses in water (which may be hot) when gently agitated therewith, forming a stable latex-like colloidal dispersion. Suitable polymers can be made by emulsion copolymerization of acrylamide with styrene in the range of about 95 : 5 to 85 : 15, followed by hydrolysis of part of the acrylamide substituents to provide about 1 to 20 mol percent of acrylic acid linkages. The term "acrylic acid linkages" includes those linkages in soluble salt form (i.e., as sodium salt form), as well as in acid form.

The styrene content of the anionic component of the polysalt is critical. I have found that the styrene substituents augment the driving force of the cationic substituents and permit paper of high dry strength (and if desired, wet strength) to be manufactured from pulps which contain a high concentration of black liquor soap. When less than about 5 mol percent of styrene units are present in the anionic polymer, use of the polysalt provides no significant economic advantage. When more than about 15 mol percent of these substituents are present in the anionic component, the polysalt decreases in its strengthening properties since an increase in the content of styrene units in the anionic polymer is generally at the expense of the amide substituents therein. It is the amide substituents which provide most of the strengthening properties of the polysalt.

The anionic polymers used in the present invention can contain linkages other than those disclosed in the present application provided that those other linkages are of such kind and are present in such small proportion as not to change the essential character of the polymer.

Thus, the polymer can contain small proportions of methacrylamide, N-diethylacrylamide, vinylphthalimide and maleamide linkages; p-chorostyrene, p-vinyltoluene, p-chloromethylstyrene, 2-vinylnapthalene and acrylonitrile linkages; and maleic acid, vinylbenzoic, and acrylic acid linkages.

The cationic component of the polysalt can be any water-soluble polyamine which has a molecular weight in excess of about 1,000, as the cationic molecule must be large enough to bind at least several of the anionic molecules together thereby ensuring that all the anionic macromolecules are formed into colloidal complex state when the polysalt-ionization suppressor solution is added to the pulp, and to drive on to the fibers as high as practicable a proportion of the polyamine.

The particular polyamine (or mixture of polyamines) to be used in any instance is not critical as the polyamine does not interfere with the substantivity imparted by the styrene units. However, I prefer to use a cationic polyamino water-Soluble dry- (or dry- and wet-) strenthening agent because these agents, which have molecular weights in excess of 1,000, possess adequate molecular size and cationicity, and in addition make their own contribution to the strength of the paper product. The cationic strengthening agent may be non-thermosetting or thermosetting, and in the latter event the paper product must be heated to thermosetting temperature (190° – 250° F.) to obtain the full benefit thereof.

The cationic strengthening agent can be the non-thermosetting water-soluble polyamidopolyamine-epichlorohydrin condensate of U.S. Pat. No. 3,329,657; polyvinylimidazoline; poly-N-(2-aminoethyl)acrylamide; polyvinylpyridine; and polymerized vinylmethylpyridinium chloride; other water-soluble vinyl polymers containing quaternary ammonium substituents including the 90 : 10 molar ratio acrylamide:diallyldimethyl ammonium chloride copolymers (U.S. Pat. Nos. 2,884,057 and 2,884,058); the polymers composed of acrylamide and vinylamine linkages of U.S. Pat. No. 2,890,978; the non-thermosetting amine-epichlorohydrin dry strength resins of U.S. Pat. Nos. 3,258,393 and 3,567,659; cationic starch; and the water-soluble salts of deactylated chitin. All of these have molecular weights in excess of 1,000. If desired, these polymers can beneficially carry a small proportion of styrene units in the range of 5 – 15 mol percent.

The anionic and cationic components are present in such ratio that a polysalt composed of these two polymers is soluble in water at a pH below 3, but insoluble in water at a pH in the mildly acidic to neutral pH range of 4 to 7. Such polysalts are generally composed of anionic and cationic components in weight ratio between about 9 : 1 and 1 : 1, i.e., in a charge equivalent ratio of about 1.25 : 1 to 0.5 : 1. I have found that this solubility requirement ensures that when a 1 – 10% by weight solution of the polysalt-ionization suppressor complex of the present invention (which generally has a pH below 2) is added to a large volume of water having a pH in the range of 4 to 7, the polysalt separates as an insoluble phase consisting of discrete colloidal particles which are neutral or ionic, and which are substantively adsorbed by the fibers.

It has not been found possible to develop a general rule which will permit predetermination of the ratio of the number of the anionic substituents in the polysalt of the present invention to the number of cationic substituents needed for formation of compositions of the present invention. The ratio varies from instance to instance, and is affected by such independent variables as the amount and the degree of ionization of the anionic substituents (e.g., carboxyl as compared with sulfo substituents); the charge of the cationic substituents (e.g., amine as compared with quaternary ammonium substituents); the number and kind of hydrophobic and hydrophilic substituents present; and the respective molecular weights of the anionic and cationic polymers. However, in any instance a suitable ratio is easily found by laboratory trial. One method is to add a 10% aqueous solution of a suitable cationic polymer slowly to a 10% aqueous solution of a suitable anionic polymer, the pH of the solution being maintained at 5.5. The correct ratio is found when an insoluble colloidal precipitate occurs. When the pH is adjusted to 2 or less with a strong acid, a clear solution results from which the polysalt colloid precipitates when the solution is added to mildly acidic beater pulp. If desired, the proportion of the cationic component can be increased somewhat, and this often improves the dry strengthening properties of the polysalt.

According to another method, a suitable ratio can be found by preparing 10% by weight aqueous solutions of the anionic and cationic components in various ratios at pH 4 to 7 and then adding a strong water-soluble acid. Those ratios are suitable which provide polysalts which are insoluble in the pH range of 4 to 7 but which dissolve at a lower pH, preferably below pH 3, and which form a colloid when the pH of the solution is raised to 4 – 7. Formation of the colloid can be seen by filtering a sample of the papermaking suspension to be treated (to remove all solids therefrom), adding sufficient of the polysalt-ionization suppressor solution to provide about 0.001% by weight of the polysalt, and adjusting the pH to 4 – 7. Formation of a colloidal phase (visible by Tyndall effect) shows that the anionic and cationic components are present in proper ratio.

In practice, the polysalt-ionization complex is prepared by mixing 10% – 20% aqueous solutions of the anionic and cationic components (in previously ascertained desirable ratio). The polysalt thus formed does not dissolve, but forms a supernatant layer. A sufficient amount of a strong water-soluble acid is then added to cause the two phases to dissolve. A suitable amount of acid has been added when the supernatant layer dissolves and remains soluble when the resulting solution is diluted with water to 0.5% – 1% polymer solids content. The pH of the latter solution usually is about 2.5 – 3.0.

If preferred, the ionization suppressor can be added to the cationic component, in which event the anionic component forms a soluble polysalt directly.

Suitable strong water-soluble acids which are satisfactory for use as ionization suppressors include benzenesulfonic, hydrochloric, sulfuric, phosphoric, nitric, chloroacetic, bromoacetic, trichloroacetic acids and other similar monomeric acids which have a pH of less than 3 and which are compatible with the polysalt (i.e., which do not form a precipitate therewith). Volatile acids (i.e., acids which are steam-distillable) such as hydrochloric acid are preferred when paper having an alkaline pH is desired. Normally solid acids (e.g., 1- and 2- naphthalene sulfonic acids) can be used when it is desired to prepare the components as a particulate free-flowing blend.

The polysalt of the present invention may be thermosetting or non-thermosetting. It possesses wet strengthening properties (in addition to dry strengthening properties) when at least one of its components carries a sufficient number of reactive substituents to render the component thermosetting. Substituents which impart thermosetting properties are methylol substituents (introduced by formaldehyde), —CHOHCHO substituents (introduced by glyoxal), and epoxy

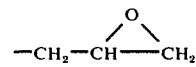

substituents (introduced by epichlorhydrin). Thus, for example, the anionic component may be a vinylamide linkage carrying a methylol or glyoxal substituent, or the cationic component may be a polyalkylenepolyamine linkage carrying a thermosetting substituent. Polymers carrying these substituents are disclosed in U.S. Pat. Nos. 2,345,543 and 2,986,489 (methylol substituents); 2,595,935 and 2,926,154 (epoxy substituents); and 3,556,932 (glyoxal substituents). Alternatively, the polymers can be those which possess wet strengthening properties but which possess no identifiable wet strengthening substituents, for example polyethylenimine.

The polysalt possesses dry strengthening properties (without possessing wet strengthening properties)

when neither of the components carries thermosetting substituents.

The present invention also includes a particulate free-flowing blend (i.e., physical mixture) of the anionic component, the cationic component and the ionization suppressor all in appropriate proportions. A polysalt according to the present invention forms when the blend is dissolved in water.

The polysalt-ionization suppressor compositions of the present invention are used in papermaking by distributing them uniformly through the papermaking stock into paper. For convenience in metering, they are preferably diluted to 1% – 5% solids in water having an appropriately low pH, and are added as close to the fourdrinier wire as is practical, for example, at the fan pump or head box. The compositions can be successfully added to furnishes which contain alum in normal amount and which thus have a pH in the range of 4 – 6. This secures the full benefit of the alum present and incorporates alum into the paper, and when one or both of the polymers carries aldehyde thermosetting substituents, best wet strengthening is obtained.

The compositions can also be successfully added to substantially neutral pulps (i.e., pulps having a pH in the range of 6 or 7 or slightly higher), permitting the production of neutral or alkaline paper.

The polysalt is added in suitable amount to provide the desired amount of strengthening. The polysalt is effective for the purpose when present in the range of 0.1% – 3% (polymer solids based on the dry weight of the fibers). The wet web is dried as is customary (for example ¼ t 3 minutes on rolls having a surface temperature between about 190° F. and 250° F.) This is sufficient to develop the wet-strengthening properties of polymers which contain thermosetting components. The polysalt can also be applied by size press or it can be sprayed on the wet web.

The polysalt is also useful as flocculant in the purification of water having a suspended content of mineral and organic matter or fiber fines, such as in a saveall.

The invention is more fully described in the examples. These examples are preferred embodiments of the invention, and should not be construed as limitations thereon.

DESCRIPTION OF THE PREFERRED EMBODIMENTS

EXAMPLE 1

The following illustrates the preparation and certain of the properties of a series of polysalt-ionization inhibitor compositions, according to the present invention.

The polysalt in each instance is prepared by mixing a 10% by weight solution of a cationic polymer (as described in the table below, adjusted to pH 2) with an equal amount of a 10% by weight solution of a vinyl anionic polymer composed of acrylamide, styrene, and acrylic acid linkages in about 80 : 11 : 9 molar ratio, also adjusted to pH 2. Opalescent solutions form.

A sample of each solution is held at 70° F. for 30 days to determine its storage-stability, and a sample is diluted to about 0.001% solids with water at pH 6 to determine whether the solution develops a polysalt colloid when so diluted.

Results are as follows.

| Soln. No. | Composition[1] Cationic Polymer[3] | Ionizat. Inhibitor | Stability[2] On Dilution To 0.001%[4] | After 1 Mo. |
|---|---|---|---|---|
| 1 | Cationic starch | HCl | Forms colloid. | No change |
| 2 | Polyvinylimidazoline | $H_2SO_4$ | " | " |
| 3 | Polyethylenimine | HCl | " | " |
| 4 | Adipic acid - DETA[5] | " | " | " |
| 5 | AM-DADMA (glyoxalated thermosetting)[6] | " | " | " |
| 6 | Urea-TETA-$CH_2O$[7] | " | " | " |

[1]Contains anionic and cationic polymers in 1 : 1 weight ratio. The cationic polymers have molecular weights in excess of 1,000.
[2]Of 10% solution of polysalt and ionization inhibitor having a pH below 3.
[3]DETA = diethylenetriamine; TETA = triethylenetetramine; AM = acrylamide; DADMA = diallyldimethylammonium chloride.
4On dilution to 0.001% polymer solids with water at pH 6.
5For preparation see U.S. Pat. No. 2,926,154.
6For preparation see Williams et al. U.S. Pat. No. 3,556,932.
7For preparation see U.S. Pat. No. 2,926,154.

EXAMPLE 2

The syrupy polymer supernatant layer obtained by mixing one volume of the 10% aqueous anionic polymer solution of Example 1 with one volume of a 10% aqueous polyethylenimine solution is drawn off. A portion is used to cement two aluminum panels together under 1,000 lb./in.² pressure and 200° C. for 10 minutes. On cooling, the panels are strongly bonded together.

EXAMPLE 3

The following illustrates the dry strength imparted by certain polysalts of the present invention in the manufacture of paper from a pulp of unbleached fibers in an aqueous medium containing a large amount of black liquor.

A series of polysalt-ionization suppressor solutions is prepared by the general method of Example 1. The anionic polymer is composed of acrylamide, styrene and acrylic acid units in 75.8 : 20.2 : 4 molar ratio respectively. The cationic polymers are stated in the table below. In each instance a 10% solution of the anionic polymer is mixed with sufficient of a 10% solution of the cationic polymer to provide a polysalt containing the anionic and cationic polymers in 4 : 1 weight ratio, equivalent to a roughly 1 : 1 ratio in terms of ionic functionalities, followed by enough concentrated hydrochloric acid to adjust the pH to 2.

A stock papermaking suspension is prepared by slurrying well-beaten unbleached kraft fibers (known as "Fortopulp") in water containing 3% of black liquor solids and 1% alum and diluting to a consistency of 0.7% (percentages based on the dry weight of the fibers). The resulting suspension has a pH of 5.7.

In each instance an aliquot of the suspension is taken and to this is added sufficient of one of the polysalt-ionization suppressor solutions (diluted to 1% solids with water) in amount shown in the table below. Colloid formation occurs. The suspension is gently stirred for 30 seconds to permit the fibers to adsorb polysalt colloid particles, while the pH of the suspension is adjusted to 5.7.

In each instance addition of the polysalt solution causes the freeness of the pulp to increase perceptibly (by 3% – 4%).

The fibers are formed into a wet web on a laboratory handsheet machine at a basis weight of 70 lb. per 25 × 40 inches/500 ream. The wet web is dried for 2 minutes on a laboratory drum drier having a surface temperature of 240° F. The dry strength of the resulting paper is determined by the Mullen burst test and by the internal bond test (delamination in the "z" direction).

Results are as follows.

| Run No. | Cationic Polymer | % Polysalt Added[a] | Burst Lb./in.$^2$ | % Increase | Ft.-lb./in.$^2$ |
|---|---|---|---|---|---|
| Control | None | — | 53.0 | — | 0.058 |
| 1 | Isophthalic - DETA - epi[b] | 0.2 | 61.8 | 16.6 | 0.085 |
| 2 | " | 0.4 | 71.3 | 34.6 | 0.105 |
| 3 | Adipic - TETA - epi[c] | 0.2 | 64.3 | 21.3 | 0.093 |
| 4 | " | 0.4 | 71.8 | 35.5 | 0.104 |
| 5 | Adipic - DETA - epi[d] | 0.2 | 66.2 | 25.0 | 0.088 |
| 6 | " | 0.4 | 69.0 | 30.0 | 0.103 |

[a]Based on dry weight of fibers.
[b]Isophthalic acid-diethylenetriamine-epichlorohydrin thermosetting wet- and dry-strength polymer of U.S. Pat. No. 3,733,290.
[c]Adipic acid-tetraethylenetetramine-epichlorohydrin non-thermosetting dry-strength polymer of U.S. Pat. No. 3,329,657.
[d]Adipic acid-diethylenetriamine-epichlorohydrin thermosetting wet- and dry-strength polymer of U.S. Pat. No. 2,926,154.

EXAMPLE 4

The following illustrates the improvement in drainage and in dry strength which is effected by polysalts which differ only in the carboxyl content of the anionic component.

The anionic polymer is prepared by subjecting an 88.2 : 11.8 molar ratio acrylamide : styrene copolymer to hydrolysis to the extents shown in the table below, thereby converting acrylamide units to acrylic acid units to the extents shown. The procedure of Example 3 is then repeated, the cationic component of the polysalt being the non-thermosetting adipic acid-triethylenetetramine-epichlorohydrin polymer of U.S. Pat. No. 3,329,657. The polysalt is composed of the anionic and cationic components in the average weight ratio of 3 : 1.

Addition of the polysalt causes a 3% – 4% improvement in the drainage rate. Other results are as follows.

| | | Paper Strength | |
|---|---|---|---|
| Run No. | Cat. Polymer Molar Ratio AM:St:AA | Burst % Increase | Internal Bond % Increase |
| | 0.2% Polymer Added on Wt. of Fibers | | |
| 1a | 85.8:11.8:2.4 | 4.5 | 21 |
| 2a | 82.7:11.8:5.5 | 6.6 | 24 |
| 3a | 80.3:11.8:7.9 | 8.5 | 25 |
| 4a | 78.0:11.8:10.2 | 10.0 | 26 |
| | 0.4% Polymer Added on Wt. of Fibers | | |
| 1b | 85.8:11.8:2.4 | 12.0 | 41 |
| 2b | 82.7:11.8:5.5 | 13.9 | 46 |
| 3b | 80.3:11.8:7.9 | 15.0 | 44 |
| 4b | 78.0:11.8:10:2 | 15.0 | 45 |

EXAMPLE 5

The following illustrates another method for determining the optimum proportion of acid substituents in the anionic polymer and for determining the optimum anionic:cationic polymer ratio. It has been found that usually the effectiveness of a polysalt in promoting the freeness of a pulp is a measure of its effectiveness as a paper strengthening agent.

The general method of Example 3 is followed except that the pulp is adjusted to pH 5.5 after addition of the polysalt solution and the composition of the polysalt is as shown in the table below. In each instance the cationic component of the polysalt is the non-thermosetting adipic acid:triethylenetetramine-epichlorohydrin condensate of U.S. Pat. No. 3,329,657.

Results are as follows.

| Run No. | Cat. Polymer Molar Ratio[a] AM:St:AA | Wt. Ratio Anionic Cationic[b] | Freeness Increase Ml.[c] |
|---|---|---|---|
| 1 | 86.1:11.8:2.1 | 50/50 | 25 |
| 2 | | 60/40 | 30 |
| 3 | | 70/30 | 40 |
| 4 | | 80/20 | 40 |
| 5 | | 90/10 | 40 |
| 6 | 82.5:11.8:5.7 | 50/50 | 30 |
| 7 | | 60/40 | 35 |
| 8 | | 70/30 | 40 |
| 9 | | 80/20 | 45 |
| 10 | | 90/10 | 45 |
| 11 | 77.1:11.8:11.1 | 50/50 | 20 |
| 12 | | 60/40 | 25 |
| 13 | | 70/30 | 28 |
| 14 | | 80/20 | 30 |
| 15 | | 90/10 | 25 |

[a]Molar ratio of acrylamide, styrene and acrylic acid units in cationic polymer.
[b]Weight ratio of anionic polymer to cationic polymer in polysalt.
[c]Increase in freeness (Canadian standard) of pulp over respective controls (600–650 ml.) caused by addition of polysalt-ionization inhibitor solution.

EXAMPLE 6

The following illustrates additional polysalts within the present invention and the manufacture of strengthened paper therewith.

The procedure of Example 3 is repeated except that the pulp contains 200 parts of dissolved sulfate ions per million parts by weight of solution, the pulp is adjusted to pH 5.5 after addition of the polysalt, and the polysalts are the interaction product of 1 part by weight of an anionic polymer composed of acrylamide, styrene and acrylic acid units in 80:11:9 molar ratio with the amount of the cationic polymer shown in the table below, and in each instance the amount of polysalt added is 0.4% of the dry weight of the fibers.

Results are as follows.

| Run No. | Cationic Polymer Name | Wt. %[a] | Charge %[b] | Paper Strength Burst Lb./in.² | Internal Bond Ft.lb./in.² |
|---|---|---|---|---|---|
| Blank | None | | | 95.4 | 0.081 |
| 1 | Cationic starch | 400 | 50 | 107.1 | 0.113 |
| 2 | Cationic starch | 200 | 26 | 104.5 | 0.106 |
| 3 | Cationic starch | 100 | 13 | 110.9 | 0.109 |
| 4 | Poly-2-vinyl imidazoline[c] | 20 | 167 | 105.9 | 0.127 |
| 5 | Poly-2-vinyl imidazoline[c] | 11 | 93 | 113.3 | 0.112 |

[a]Weight of cationic polymer on weight of anionic polymer.
[b]Number of cationic groups in cationic polymer per 100 anionic groups in anionic polymer.
[c]Contains 10 mol percent of methyl methacrylate units.

EXAMPLE 7

The following illustrates the simultaneous improvement in strength and in freeness imparted by a preferred polymer of the present invention.

The procedure of Example 3 is repeated except that the polysalt is a 4 : 1 by weight mixture of an 80 : 10 : 10 molar ratio acrylamide : styrene : acrylic acid copolymer and the non-thermosetting cationic polymer is made by substantially completely reacting 0.3 mol of epichlorohydrin with a 1 : 1 molar ratio adipic acid : triethylenetetramine condensate.

Results are as follows.

| Run No. | % Polysalt Added | Freeness ml. | Burst % Incr. |
|---|---|---|---|
| Control | None | 500 | — |
| 1 | 0.2 | 521.5 | 11.5 |
| 2 | 0.4 | 540.0 | 15.0 |

EXAMPLE 8

The following illustrates performance of the process of the present invention on a commercial scale.

The process is applied in a modern paper mill making paper of 100 lb. basis weight per 25 × 40 inches/500 ream from a furnish of unbleached kraft pulp containing 3% black liquor solids and 1% alum and having a pH of 5.5. The paper has a dry tensile strength of about 78 lb./inch, and is regarded as the control paper.

There is then added at the fan pump 0.3% (polymer solids based on the dry weight of the fibers) of a polysalt-ionization inhibitor composition wherein the polysalt is 80% by weight of an 82.1:10.0:7.9 molar ratio acrylamide : styrene : acrylic acid, and 20% by weight the water-soluble non-thermosetting cationic polymer formed by substantially completely reacting 0.3 mol of epichlorohydrin with a 1 : 1 molar ratio adipic acid : triethylenetetramine condensation product, and contains hydrochloric acid in sufficient amount to give the solution a pH of 2. The composition is added to the furnish as a 1% aqueous solution, and causes some foam.

There is then added at the fan pump (in addition to the polysalt) a non-ionic silicone anti-foaming agent (GE-72) as needed to suppress the foam. This causes a substantial increase in the drainage rate.

The dry strength of the paper is determined after each addition. Results are as follows.

| Test | Test Additives Polysalt | Antifoam | Paper Strength Found[a] | % Incr.[b] |
|---|---|---|---|---|
| Control | None | None | 78.0 | — |
| A | 0.3%[c] | None | 85.3 | 9.4 |
| B | 0.3% | As needed to suppress foam | 91.2 | 14.7 |

[a]Lb./inch.
[b]Based on control.
[c]Weight of polysalt in polysalt-ionization complex based on dry weight of the fibers.

I claim:

1. A polysalt of (A) a normally water-insoluble but water-dispersible anionic vinyl polymer consisting essentially of 65 to 94 mol percent of acrylamide units, 5 to 15 mol percent of styrene units, and 1 to 20 mol percent of acrylic acid units; and (B) a cationic water-soluble polyamine having a molecular weight in excess of 1,000, the ratio of the number of anionic substituents in said anionic polymer to the number of cationic substituents in said polyamine being between about 50/50 and 90/10 such when 1%–10% by weight of an aqueous solution of a polysalt-ionization suppressor complex is added to water having a pH in the range of 4 to 7, said polysalt separates as an insoluble phase consisting of discrete colloidal particles which are neutral or ionic, wherein said polysalt-ionization complex is prepared by mixing 10%–20%, by weight, aqueous solutions of (A) and (B) so as to form a supernatant layer, adding a strong water-soluble acid with a pH of less than about 3 to the mixture, such that the supernatant layer dissolves and remains soluble when the resulting solution is diluted with water to a 0.5%–1% polymer solids content.

2. An aqueous colloidal dispersion of a polysalt according to claim 1.

3. A polysalt according to claim 1 wherein the anionic polymer is composed of acrylamide units, styrene units and acrylic acid units in about 80 : 10 : 10 molar ratio respectively.

4. A polysalt according to claim 1 wherein the polyamine is a non-thermosetting 1 : 1 : 0.3 molar ratio adipic acid:diethylenetriamine:epichlorohydrin condensate.

5. A polysalt according to claim 1 wherein the cationic polyamino strengthening agent is a non thermosetting alkylamine-epichlorohydrin dry strength resin.

6. A polysalt according to claim 1 wherein the cationic polyamino strengthening agent is a poly(alkyleneamido) poly(alkyleneamine) epichlorohydrin strengthening agent.

7. A polysalt according to claim 1 wherein the cationic polyamino strengthening agent is poly-2-vinylimidazoline.

8. An aqueous solution of a polysalt according to claim 1 in aqueous medium containing a sufficient amount of an acidic ionization suppressor to suppress ionization of at least about ⅔ of the anionic substituents of said polysalt.

9. A solution according to claim 8 wherein the ionization suppressor is hydrochloric acid.

* * * * *